(12) United States Patent
Johnson et al.

(10) Patent No.: US 11,408,999 B2
(45) Date of Patent: Aug. 9, 2022

(54) LIDAR CAMERA SYSTEMS

(71) Applicant: Goodrich Corporation, Charlotte, NC (US)

(72) Inventors: James B. Johnson, Reading, MA (US); Ian Peter Humphrey, Foxboro, MA (US)

(73) Assignee: Goodrich Corporation, Charlotte, NC (US)

( * ) Notice: Subject to any disclaimer, the term of this patent is extended or adjusted under 35 U.S.C. 154(b) by 966 days.

(21) Appl. No.: 16/131,747

(22) Filed: Sep. 14, 2018

(65) Prior Publication Data
US 2020/0088880 A1 Mar. 19, 2020

(51) Int. Cl.
*G01S 17/89* (2020.01)
*G01S 17/86* (2020.01)
*G02B 26/12* (2006.01)
*G02B 27/30* (2006.01)

(52) U.S. Cl.
CPC .............. *G01S 17/89* (2013.01); *G01S 17/86* (2020.01); *G02B 26/12* (2013.01); *G02B 27/30* (2013.01)

(58) Field of Classification Search
CPC ........ G01S 17/86; G01S 17/89; G01S 7/4817; G01S 17/894; G01S 17/08; G01S 7/4808; G01S 17/10; G01S 17/34; G01S 17/42; G01S 17/87; G01S 17/88; G01S 7/4812; G01S 7/4813; G01S 7/4814; G01S 7/4815; G01S 7/4816; G01S 7/4865; G01S 7/497; G01S 7/499; G02B 26/12; G02B 27/30; G02B 26/108; G02B 21/0028; G02B 21/0068; G02B 21/0076; G02B 23/2407; G02B 26/0883; G02B 26/0891; G02B 26/101; G02B 26/106; G02B 5/04; G05D 1/0676; G06T 7/30
See application file for complete search history.

(56) References Cited

U.S. PATENT DOCUMENTS

| | | | |
|---|---|---|---|
| 6,219,111 B1 * | 4/2001 | Fukuda | G02B 3/0043 349/5 |
| 6,384,944 B1 | 5/2002 | Takayama et al. | |
| 8,421,003 B2 | 4/2013 | Fest et al. | |
| 9,285,464 B2 | 3/2016 | Pennecot et al. | |
| 2001/0046345 A1 * | 11/2001 | Snyder | G02B 6/3524 385/16 |
| 2004/0036934 A1 * | 2/2004 | Dube | G02B 26/101 359/196.1 |

(Continued)

OTHER PUBLICATIONS

Extended European Search Report dated Jan. 15, 2020 isued during the prosecution of European Patent Application No. EP 19197398.1.

*Primary Examiner* — Yuqing Xiao
*Assistant Examiner* — Amir J Askarian
(74) *Attorney, Agent, or Firm* — Locke Lord LLP; Joshua L. Jones; Scott D. Wofsy

(57) ABSTRACT

A LIDAR system includes an imaging sensor optically aligned with imaging optics along a first optical path. A laser source is optically aligned with laser optics along a second optical path. A single scanning mechanism is aligned with both the first optical path and the second optical path for directing outgoing laser illumination from the laser source in a scanning direction and for directing incoming laser return illumination from the scanning direction.

13 Claims, 2 Drawing Sheets

(56) References Cited

U.S. PATENT DOCUMENTS

| | | | |
|---|---|---|---|
| 2011/0163234 A1* | 7/2011 | Cluff | G02B 26/0891 |
| | | | 250/341.1 |
| 2013/0293681 A1 | 11/2013 | Borowski | |
| 2017/0146639 A1* | 5/2017 | Carothers | G01S 7/484 |
| 2017/0350983 A1 | 12/2017 | Hall et al. | |
| 2018/0081094 A1 | 3/2018 | Aikin et al. | |
| 2018/0100929 A1* | 4/2018 | O'Keeffe | G01S 17/10 |
| 2018/0128903 A1* | 5/2018 | Chang | G01S 17/10 |
| 2018/0188370 A1* | 7/2018 | Lin | G01S 17/10 |
| 2018/0284237 A1* | 10/2018 | Campbell | G01S 17/42 |
| 2018/0284282 A1* | 10/2018 | Hong | H01S 5/4075 |
| 2019/0162828 A1* | 5/2019 | Liang | G01S 7/4817 |
| 2020/0000336 A1* | 1/2020 | Bublitz | A61B 3/12 |

* cited by examiner

LIDAR CAMERA SYSTEMS

BACKGROUND OF THE INVENTION

1. Field of the Invention

The present disclosure relates to optical systems, and more particularly to LIDAR systems.

2. Description of Related Art

LIDAR and rangefinder imaging systems require two primary components: a laser emitter, which includes a light source and optics, and an imaging receiver, which includes optics and a sensor, e.g. an imaging sensor in LIDAR cameras. Due to the size of each, these two primary components traditionally require separate scanning mechanisms to meet requirements for pointing accuracy and SWAP (size weight and power). The separate scanning mechanisms must be controlled to keep them synchronized which can be limiting in terms of high speeds.

The conventional techniques have been considered satisfactory for their intended purpose. However, there is an ever present need for improved LIDAR systems. This disclosure provides a solution for this need.

SUMMARY OF THE INVENTION

A LIDAR system includes an imaging sensor optically aligned with imaging optics along a first optical path. A laser source is optically aligned with laser optics along a second optical path. A single scanning mechanism is aligned with both the first optical path and the second optical path for directing outgoing laser illumination from the laser source in a scanning direction and for directing incoming laser return illumination from the scanning direction.

In embodiments, the first optical path does not pass through the laser optics and the second optical path does not pass through the imaging optics. The laser optics and the imaging optics can be spaced apart from one another so the first optical path bypasses the laser optics and so the second optical path bypasses the imaging optics. At least one of the first and second optical paths can be free of fold mirrors. At least one of the first and second optical paths can include a fold mirror.

The single scanning mechanism can be a single Risley prism having one or more prism elements. The Risley prism can have a diameter, wherein in the imaging optics have a diameter, and wherein the laser optics have a diameter, wherein the diameter of the Risley prism is greater than the diameters of the laser optics and imaging optics added together to prevent optical vignetting.

The laser source can include a laser generator with an optic fiber optically coupling between the laser generator and the laser optics. The laser optics can include a collimator, wherein the optic fiber optically couples the laser generator to the collimator. The laser optics can include a beam shaper optically aligned between the scanning mechanism and the collimator. The laser optics can include a fold mirror that optically couples the collimator and the beam shaper. The laser optics can include a first fold mirror for diverting the first optical path wherein the imaging optics include a second fold mirror for diverting the second optical path. The first and second optical paths can be parallel to one another in at least a portion of the scanning mechanism.

The imaging sensor can be a focal plane array (FPA) configured to receive a two-dimensional image of the return illumination. A controller can be operatively connected to the imaging sensor for receiving image data characterizing the laser return illumination, wherein the controller is operatively connected to the laser source for controlling and/or timing pulses of the outgoing laser illumination and for triggering/synchronizing the FPA with the laser pulse to capture an image, and is operatively connected to the scanning mechanism for coordinating imaging from the imaging sensor with scanning of the outgoing laser illumination and laser return illumination along the scanning direction.

A method includes directing outgoing laser illumination from a laser with a scanning mechanism and directing incoming laser return illumination with the scanning mechanism to a sensor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
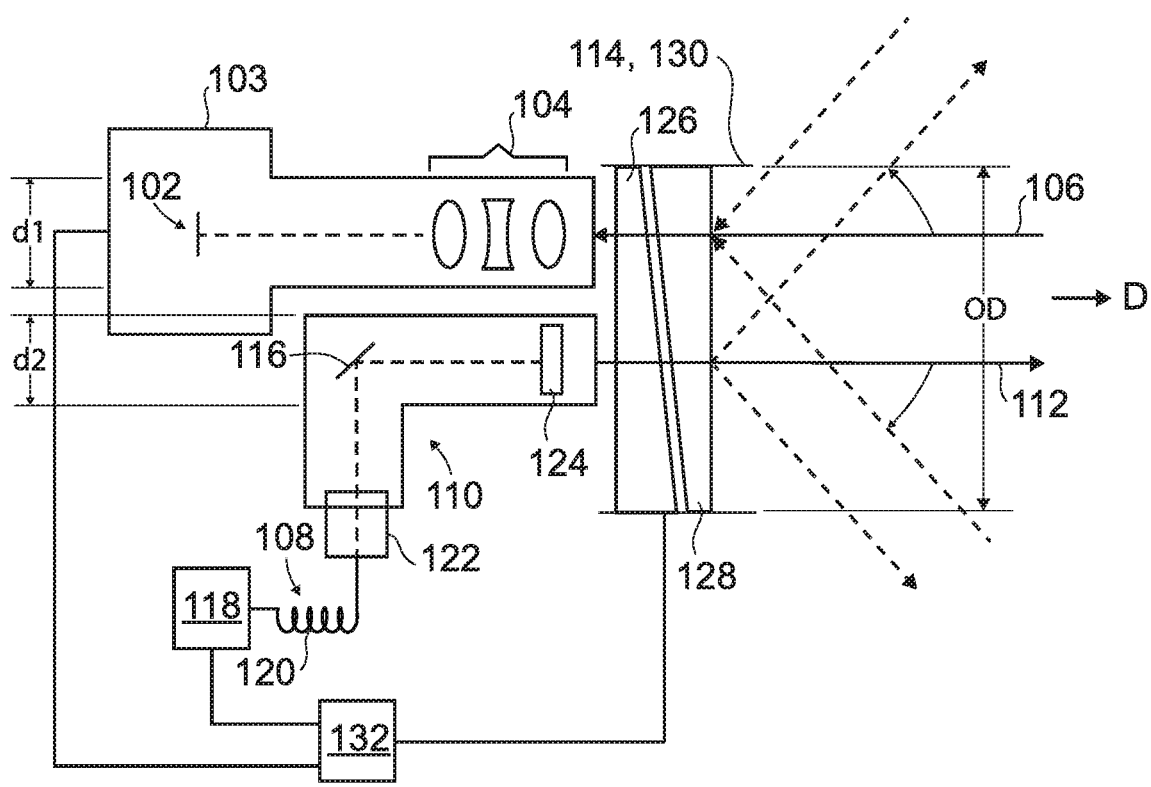
FIG. 1 is a schematic view of an exemplary embodiment of a LIDAR system constructed in accordance with the present disclosure, showing the first and second optical paths passing through the scanning mechanism.

Reference will now be made to the drawings wherein like reference numerals identify similar structural features or aspects of the subject disclosure. For purposes of explanation and illustration, and not limitation, a partial view of an exemplary embodiment of a LIDAR system in accordance with the disclosure is shown in FIG. 1 and is designated generally by reference character 100. Other embodiments of LIDAR systems in accordance with the disclosure, or aspects thereof, are provided in FIGS. 2-3, as will be described. The systems and methods described herein can be used to simplify control and improve SWAP (size weight and power) characteristics in LIDAR systems.

A LIDAR system 100 includes an imaging sensor 102 optically aligned with imaging optics 104, e.g., one or more lens elements, along a first optical path 106. A laser source 108 is optically aligned with laser optics 110 along a second optical path 112. A single scanning mechanism 114 is aligned with both the first optical path 106 and the second optical path 112 for directing outgoing laser illumination from the laser source 108 in a scanning direction D and for directing incoming laser return illumination to the imaging sensor 102 from the scanning direction D. The scanning direction D changes over time so the LIDAR system 100 can scan laser illumination pulses across a scene and detect the returns of the laser pulses reflected from the scene. Analysis of the time of flight for the laser pulses allows the LIDAR system 100 to construct a three-dimensional model of the scene.

The first optical path 106 does not pass through the laser optics 110. The second optical path 112 does not pass through the imaging optics 104. The laser optics 110 and the imaging optics 104 are spaced apart from one another so the first optical path 106 bypasses the laser optics 110 and so the second optical path 112 bypasses the imaging optics 104. The first optical path 106 is free of fold mirrors. The second optical path 112 includes an optional fold mirror 116 diverting the second optical path 112, which allows the laser source 108 to be laterally offset from the second optical path 112.

The single scanning mechanism 114 is a single Risley prism in which one or both of the prism elements 126 and 128 rotate relative to the housing 130. While shown and described as having two prism elements 126 and 128, those skilled in the art will readily appreciate that the Risley prism can have any suitable number of prism elements without departing from the scope of this disclosure. The Risley prism has diameter OD, e.g. a limiting aperture for the optical rays. The imaging optics 104 have a diameter d1, e.g. an outer diameter of an objective lens. The laser optics 110 have a diameter d2, e.g. an effective optical diameter. The diameter OD of the Risley prism is greater than the sum of the diameters d1 plus d2 of the laser optics 110 and imaging optics 104, sized to prevent optical vignetting on a mechanical surface of the scanning mechanism 114. For example, if the Risley prism has an effective optical diameter of two inches (5.08 cm), then the imaging optics 104 can have an objective diameter of one inch (2.54 cm) or less, and the laser optics 110 can have an effective optical diameter of one inch (2.54 cm) or less.

The laser source 108 includes a laser generator 118, which is incorporated as a LIDAR transmitter, with an optic fiber 120 optically coupling between the laser generator 118 and the laser optics 110, i.e. a portion of the second optical 112 path follows along the optic fiber 120. Those skilled in the art will readily appreciate that the optic fiber 120 is optional, and that any other suitable arrangement, such as a direct coupled laser, can be used without departing from the scope of this disclosure. The laser optics 110 include a collimator 122, wherein the optic fiber 120 optically couples the laser generator 118 to the collimator 122. The laser optics 110 include a beam shaper 124 optically aligned between the scanning mechanism 114 and the collimator 122. The laser optics 110 include the fold mirror 116 that optically couples the collimator 122 and the beam shaper 124. The first and second optical paths 106 are parallel, i.e., co-aligned, to one another in at least a portion of the scanning mechanism 114, e.g., the first and second optical paths 106 are parallel to one another at least in the area between the inner prism element 126 of the Risley prism and the imaging and laser optics 104 and 110. The first and second optical paths 106 are parallel, i.e., co-aligned, throughout. They are mechanically set or boresighted to one another and they follow parallel paths through the LIDAR system 100 and can thus be parallel where they extend out of the LIDAR system 100 as well.

The imaging sensor 102 is a focal plane array (FPA) configured to receive a two-dimensional image of the return illumination, which can be incorporated in a LIDAR transmitter 103. Those skilled in the art will readily appreciate that a single pixel sensor can also be used without departing from the scope of this disclosure. A controller 132 is operatively connected to the imaging sensor 102 for receiving image data characterizing the laser return illumination. The controller 132 is operatively connected to the laser source 108 for controlling and/or timing pulses of the outgoing laser illumination and for triggering/synchronizing the FPA with the laser pulse to capture imagery. The controller 132 is operatively connected to the scanning mechanism 114 for coordinating imaging from the imaging sensor 102 with scanning of the outgoing laser illumination and laser return illumination along the scanning direction D.

Figure 2:
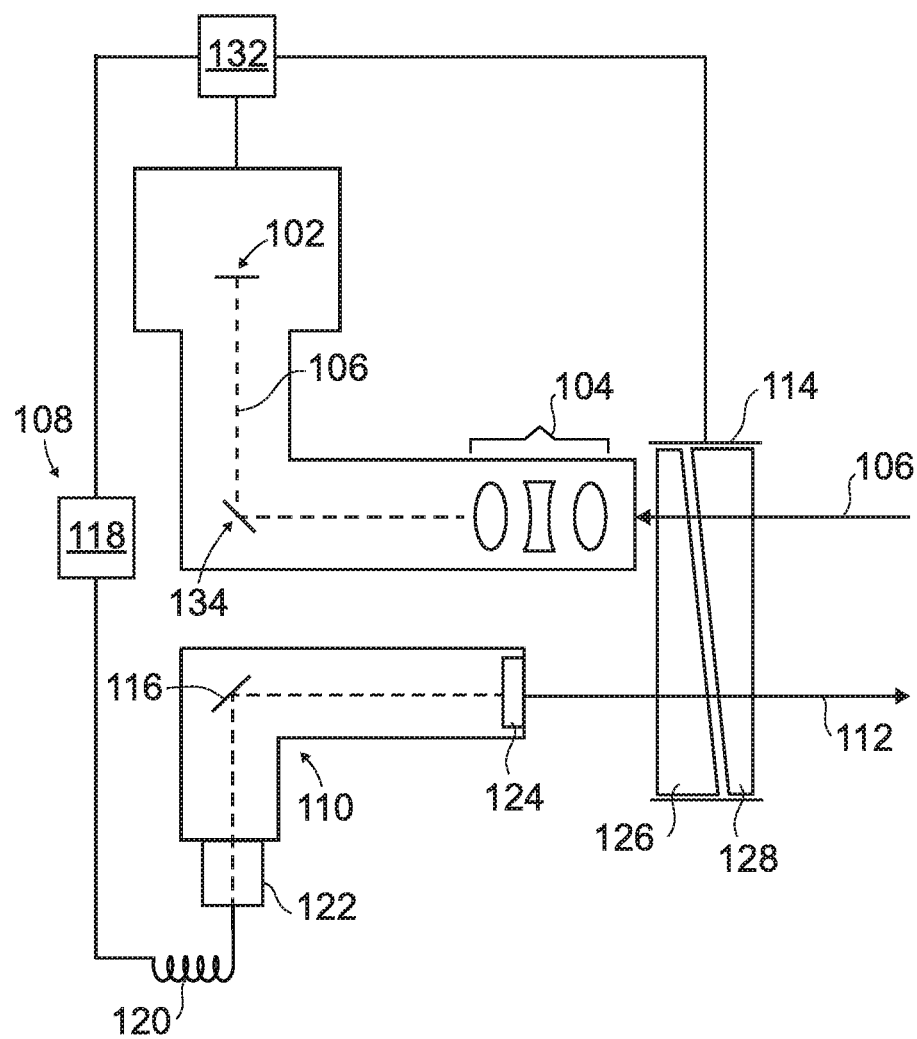
FIG. 2 is a schematic view of another exemplary embodiment of a LIDAR system constructed in accordance with the present disclosure, showing both the first and second optical paths including a respective fold mirror.
Figure 3:
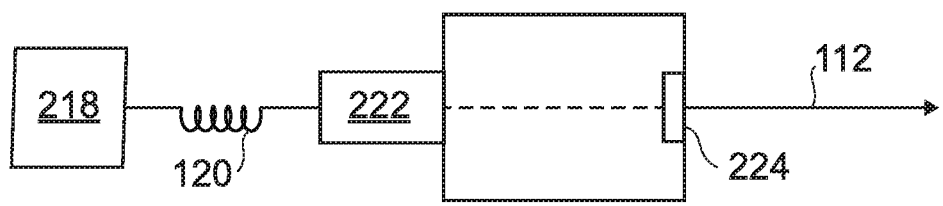
FIG. 3 is a schematic view of an exemplary embodiment of a laser source and laser optics without a fold mirror for use in LIDAR systems such as in FIGS. 1 and 2.

With reference now to FIG. 2, LIDAR system 100 is shown with all the same components as described above with reference to FIG. 1, however in FIG. 2, a fold mirror 134 is included in the first optical path 106 diverting the first optical path 106 between the imaging optics 104 and the imaging sensor 102. This allows both the imaging sensor 102 and the laser generator 118 to be offset from the respective optical paths 106 and 112. As shown in FIG. 3, another laser source configuration can be used wherein there is no fold mirror. In laser source 208, the collimator 222 and beam shaper 224 are optically coupled together along the second optical path 112 without an intervening fold mirror. Optionally, the optic fiber 220 and laser generator 218 can also be positioned in line with the collimator 222 and beam shaper 224 as shown in FIG. 3. The laser source 208 optionally can be used in lieu of the laser source 108 shown in either the configuration of FIG. 1 (in which case there are no fold mirrors in the optical paths 106 and 112) and/or FIG. 2 (in which case only the first optical path 106 includes a fold mirror 134).

Systems and method as disclosed herein can eliminate the need for a multi-element scanning system (with multiple scanning mechanisms synchronized to one another). This can remove traditional limitations on scanning speed, whereas in traditional configurations high-speed scanning systems with small deviations in angular direction between two scanning mechanisms could result in significant mismatching at distance. Systems and methods as disclosed herein can also reduce SWAP (size weight and power) as the optics can be more closely packaged and space for additional scanning mechanisms is reduced relative to traditional systems. Parallax between LIDAR transmitter and receiver in systems and methods disclosed herein can be reduced and thus more easily corrected than in traditional systems.

The methods and systems of the present disclosure, as described above and shown in the drawings, provide for LIDAR systems with superior properties relative to traditional systems including simplified control and improved SWAP (size weight and power) characteristics. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A LIDAR system comprising:
   an imaging sensor optically aligned with imaging optics along a first optical path;
   a laser source optically aligned with laser optics along a second optical path; and
   a single scanning mechanism aligned with both the first optical path and the second optical path for directing outgoing laser illumination from the laser source in a scanning direction and for directing incoming laser return illumination from the scanning direction, wherein the first optical path does not pass through the laser optics, wherein the second optical path does not pass through the imaging optics, wherein the single scanning mechanism is a single Risley prism having one or more prism elements, and wherein the Risley prism has diameter, wherein the imaging optics have a diameter, and wherein the laser optics have a diameter, wherein the diameter of the Risley prism is greater than the diameters of the laser optics and imaging optics added together to prevent optical vignetting, wherein the diameter of the laser optics is tandem and non-overlapping with the diameter of the imaging optics.

2. The system as recited in claim 1, wherein the laser optics and the imaging optics are spaced apart from one another so the first optical path bypasses the laser optics and so the second optical path bypasses the imaging optics.

3. The system as recited in claim 1, wherein at least one of the first and second optical paths is free of fold mirrors.

4. The system as recited in claim 1, wherein at least one of the first and second optical paths includes a fold mirror.

5. The system as recited in claim 1, wherein the laser optics include a collimator, wherein an optic fiber optically couples the laser generator to the collimator.

6. The system as recited in claim 5, wherein the laser optics include a beam shaper optically aligned between the scanning mechanism and the collimator.

7. The system as recited in claim 6, wherein the laser optics include a fold mirror that optically couples the collimator and the beam shaper.

8. The system as recited in claim 1, wherein the laser optics include a first fold mirror for diverting the first optical path and wherein the imaging optics include a second fold mirror for diverting the second optical path.

9. The system as recited in claim 1, further comprising a controller operatively connected to the imaging sensor for receiving image data characterizing the laser return illumination, wherein the controller is operatively connected to the laser source for controlling and/or timing pulses of the outgoing laser illumination and for triggering/synchronizing a focal plane array (FPA) with the laser pulse to capture an image, and is operatively connected to the scanning mechanism for coordinating imaging from the imaging sensor with scanning of the outgoing laser illumination and laser return illumination along the scanning direction.

10. The system as recited in claim 1, wherein the imaging sensor is a focal plane array (FPA) configured to receive a two-dimensional image of the return illumination.

11. The system as recited in claim 1, wherein the first and second optical paths are parallel to one another in at least a portion of the scanning mechanism.

12. The system as recited in claim 1, wherein the laser source includes a laser generator with an optic fiber optically coupling between the laser generator and the laser optics.

13. A method comprising:
directing outgoing laser illumination from a laser with a scanning mechanism; and
directing incoming laser return illumination with the scanning mechanism to a sensor, wherein an imaging sensor is optically aligned with imaging optics along a first optical path, wherein a laser source is optically aligned with laser optics along a second optical path, wherein the scanning mechanism is a single Risley prism having one or more prism elements, wherein the Risley prism has diameter, wherein the imaging optics have a diameter, and wherein the laser optics have a diameter, wherein the diameter of the Risley prism is greater than the diameters of the laser optics and imaging optics added together to prevent optical vignetting, wherein the diameter of the laser optics is tandem and non-overlapping with the diameter of the imaging optics.

* * * * *